No. 732,640. Patented June 30, 1903.

UNITED STATES PATENT OFFICE.

THOMAS B. JOSEPH, OF SALT LAKE CITY, UTAH.

CEMENT.

SPECIFICATION forming part of Letters Patent No. 732,640, dated June 30, 1903.

Application filed August 30, 1902. Serial No. 121,689. (No specimens.)

*To all whom it may concern:*

Be it known that I, THOMAS B. JOSEPH, a citizen of the United States, residing at Salt Lake City, in the county of Salt Lake and State of Utah, have invented certain new and useful Improvements in Cement; and I do declare the following to be a full, clear, and exact description of the invention, such as will enable others skilled in the art to which it appertains to make and use the same.

My invention relates to a cement composition, and has for its object to provide a cement which can be used as a hydraulic stone cement, a wall-plaster, or for roofs or flooring.

A further object of my invention is to provide a cement which can be molded into building-blocks for buildings or abutments in water, or for any other purposes where a stone is employed.

A further object of my invention is to provide a cement which will stand salt water, and which is extremely cheap to manufacture and easy of preparation.

With all these objects in view my invention consists in the hereinafter-described cement and also in the process of making same, which is as follows.

I dissolve arsenic acid in water at about the rate of thirty pounds to the ton and then stir therein stucco or powdered calcined sulfate of calcium until the same becomes a thick flowing mortar which can be run from the mortar-box into molds to there set. The arsenic combines with the calcium sulfate and makes the calcium insoluble. When then the cement has been air-dried, I soak the same in a solution of water containing about six pounds of peroxid of barium to the ton of water. The peroxid of barium forms barium sulfate with the sulfur in the calcined sulfate of calcium. The cement is again air-dried and then soaked in a solution of water and chlorid of ammonia of about one and one-half pounds to the ton of water, which operation gives the cement more resistance against heat and at the same time makes it harder. The cement is again air-dried and again soaked in heavy refined petroleum-oil, preferably the paraffin. The cement should be allowed to soak some time in this oil, after which it is taken out and allowed to dry, as this last operation has the effect of making the cement more impervious to water.

Should it be desired to color the cement, this of course can be done by coloring the water that the stucco is first introduced in, or it may be colored after it is completed by applying the color with brushes.

The above operation is applicable only where the cement is in blocks or in shapes that can be handled. Where it is on walls, floors, &c., the different solutions should be applied to the surface with brushes and allowed to thoroughly soak in.

Having thus described the process of making my cement, I do not wish to be understood as limiting myself to the exact steps nor to the proportions of the chemicals stated, as both may be varied to suit different conditions, and I consider myself clearly entitled to all such changes and modifications that fall within the limit and scope of my invention.

What I claim as new, and desire to secure by Letters Patent of the United States, is—

1. A cement containing calcined sulfate of calcium, combined with water, arsenic acid, peroxid of barium and chlorid of ammonia.

2. A cement containing calcined sulfate of calcium combined with water, arsenic acid, peroxid of barium, chlorid of ammonia and a petroleum-oil.

3. A cement containing calcined sulfate of calcium, combined with water, arsenic acid and chlorid of ammonia.

4. A cement containing calcined sulfate of calcium, combined with water and arsenic acid.

In testimony whereof I affix my signature in presence of two witnesses.

THOMAS B. JOSEPH.

Witnesses:
VIRGINIA JONES,
MORRIS L. RITCHIE.